United States Patent [19]

Hida

[11] Patent Number: 5,071,797
[45] Date of Patent: Dec. 10, 1991

[54] TITANIUM CARBIDE/ALUMINA COMPOSITE MATERIAL

[75] Inventor: George T. Hida, N. Tonawanda, N.Y.

[73] Assignee: Benchmark Structural Ceramics Corporation, Amherst, N.Y.

[21] Appl. No.: 385,258

[22] Filed: Jul. 25, 1989

Related U.S. Application Data

[63] Continuation of Ser. No. 254,175, Oct. 6, 1988.

[51] Int. Cl.$^5$ ............................................. C04B 35/52
[52] U.S. Cl. ..................................... 501/87; 501/127; 204/65
[58] Field of Search .................... 501/87, 127; 264/65

[56] References Cited

U.S. PATENT DOCUMENTS

| | | | |
|---|---|---|---|
| 1,918,317 | 7/1933 | Benner et al. | 501/88 |
| 2,854,364 | 9/1958 | Lely | 148/1.5 |
| 2,862,795 | 12/1958 | Lowe | 23/208 |
| 2,886,454 | 5/1959 | Todd | 106/43 |
| 3,375,073 | 3/1968 | McMullen | 23/204 |
| 3,704,230 | 11/1972 | Loricchio | 252/182 |
| 4,069,060 | 1/1978 | Hayashi et al. | 106/65 |
| 4,284,612 | 8/1981 | Horne, Jr. et al. | 423/345 |

OTHER PUBLICATIONS

Behrens et al., *Thermochemical Modeling of Thermite Type Reactions*, pp. 43-61 Proceedings, DARPA/Army Symposium of Self Propagating High-Temp. Synthesis (SHS), Oct. 1985.
Henshaw et al., *Self Propagating High Temperature Synthesis of Ceramics* in Vacuum, pp. 634-645, Ceramic Engineirine & Science Proceedings, Jul.-Aug. 1983.
Baldoni et al., *Ceramics for Machining*, Ceramic Bulletin, vol. 67, No. 2, pp. 381-387, Feb. 1988.
Gruss, *Ceramic Tools Improve Cutting Performance*, Ceramic Bulletin, vol. 67, No. 6, pp. 993-996, Jun. 1989.
Burden et al., *Comparison of Hot-Isostatically-Pressed and Uniaxially Hot-Pressed Alumina* Titanium-Carbide Cutting Tools, Ceramic Bulletin, vol. 67, No. 6, Jun. 1988.
*Study of Solid-State Alumino Thermal Reactions: Influence of Activation and Moderation Processes*, Hiara, Thesis, Israel Institute of Technology, Haifa, Israel, Apr. 1987.

Primary Examiner—Mark L. Bell
Assistant Examiner—Deborah Jones
Attorney, Agent, or Firm—Howard J. Greenwald

[57] ABSTRACT

There is disclosed a titanium carbide/alumina composite material which contains from about 44 to about 54 weight percent of titanium carbide, from about 45 to about 53 weight percent of alumina, and less than 2 weight percent of titanium nitride, titanium oxide, titanium, or mixtures thereof.

The total amount of carbon in the titanium carbide component of the composite is least 19 weight percent. However, the amount of free carbon in this component is less than about 0.5 weight percent.

5 Claims, 2 Drawing Sheets

TITANIUM CARBIDE/ALUMINA COMPOSITE MATERIAL

CROSS-REFERENCE TO RELATED APPLICATION

This is a continuation-in-part of applicant's copending patent application U.S. Ser. No. 254,175, filed Oct. 6, 1988.

FIELD OF THE INVENTION

A titanium carbide/alumina composite material with improved properties.

BACKGROUND OF THE INVENTION

Composite materials containing both titanium carbide and alumina are known to those skilled in the art. Thus, for example, such composites may be made by mixing alumina and titanium carbide and sintering the composite. See, e.g., A. J. Vlasov et al., "Oxide-Carbide Type Ceramic Cutting tools" (in Russian), Nauchn. Tr. Vses Nauchno-Issled Proektn. Inst. Tugopl. Met. Tverd. Splavov. (14) 114 (1973); Ogava et al., "Sintered Ceramic for High Speed Cutting Tools," Japan-Kokai, 7658, 410, May 21, 1976, Abstr.; S. Bellamn, J. Sack, "Cutting Tools, Development and Use" (in German), Werkstatt Ber., 108/5/257 (1975); C. Schultz, F. Holtz, "Machining with Oxide Carbide Ceramics," Carbide J., 9/5/4, (1977); R. G. Behrens et al., "Thermochemical Modeling of Thermite-Type Reactions," Proceedings, DARPA/Army Symposium on Self-Propagating High-Temperature Synthesis (SHS), October, 1985; and W. F. Henshaw et al., "Self-Propagating High-Temperature Synthesis of Ceramics in Vacuum," Ceramic Engineering and Science Proceedings, July-August, 1983, pages 634–645. Each of these publications is hereby incorporated by reference into this specification.

One problem with prior art titanium carbide composites is that they contain substantial amounts of titanium monoxide, which detracts from the mechanical properties of materials made from the composite. The titanium component of the composite generally contains from about 3 to about 12 weight percent of oxygen.

The presence of oxygen in the titanium component will embrittle materials made by sintering the composite and will reduce mechanical properties such as the bending strength, hardness, wear resistance, fracture toughness, and the like. Furthermore, the presence of oxygen in the titanium component reduces the oxidation resistance of the sintered products made from the composite.

The theoretical amount of carbon in titanium carbide is about 20 percent; the closer the carbon content in the titanium carbide is to theoretical, the better the mechanical properties are of materials made from the titanium carbide/alumina composite. Prior art titanium carbide/alumina materials contained a titanium carbide component which contained substantially less than 20 percent of carbon, usually being comprised of from about 5 to about 18 percent of carbon.

The prior art does disclose complicated procedures for increasing the carbon content of the titanium carbide component in which, for example, the component is mixed with carbon black and catalyst and reheated at a temperature of about 2,400 degrees centigrade. See., e.g., G. V. Samsonov and Y. S. Umanskiy's "Tverdyye Soyedineniya Tugoplavkikh Metallov," published by the State Scientific Technical Literature Publishing House (Moscow), 1957, However, this prior art procedure is expensive and time consuming.

It is an object of this invention to provide a relatively inexpensive and simple process for the preparation of a composite material comprised of titanium carbide and alumina in which the titanium carbide component contains at least about 19 percent of carbon. It is another object of this invention to provide a titanium carbide/alumina composite with improved sinterability. It is yet another object of this invention to provide a titanium carbide/alumina composite in which a substantial portion of the titanium carbide material is in whisker form. It is yet another object of this invention to provide a process for preparing a monolith which may be produced from the titanium carbide/alumina composite in a single run. It is yet another object of this invention to prepare a complex composite of titanium carbide/titanium nitride/aluminum oxynitride.

SUMMARY OF THE INVENTION

In accordance with this invention, there is provided a titanium carbide/alumina composite material which contains from about 44 to about 54 weight percent of titanium carbide, from about 45 to about 53 weight percent of alumina, and less than about 2 weight percent of material selected from the group consisting of titanium nitride, titanium oxide, titanium, and mixtures thereof. The total amount of carbon in the titanium carbide component is at least about 10 weight percent; however, the amount of free carbon in this component is less than about 0.5 weight percent.

DESCRIPTION OF THE DRAWINGS

The present invention will be more fully understood by reference to the following detailed description thereof, when read in connection with the attached drawings, wherein like reference numerals refer to like elements and wherein.

DESCRIPTION OF THE PREFERRED EMBODIMENTS

In the process of this invention, an activated set of reagents is provided for a combustion synthesis reaction. As used in this specification, the term "combustion synthesis" refers to a self-sustained, highly exothermic synthesis, often referred to as "SHS" or "MTR".

"SHS," a self-sustained, highly exothermic process, is a self-propagating, high temperature form of combustion synthesis; it is a chemical process involving an exothermic reaction between a metal and a nonmetal powder mixture.

"MTR," a metallo-thermic reduction process involving thermite-type reactions, is another form of combustion synthesis; it is a chemical process involving the reduction of oxides or other compounds of metals by igniting mixtures of these compounds with powdered metals.

In the process of this invention, titanium dioxide is used as a reactant. From about 50 to about 85 weight percent of titania (by total weight of titania, aluminum component, and carbon) is used, although it is preferred to use from about 60 to about 75 weight percent. In an even more preferred embodiment, from about 62 to about 73 weight percent of titania is used.

The titania used in the process should preferably be at least about 98 percent pure. Thus, by way of illustration and not limitation, one may use titanium dioxide identified as catalog numbers 11396 or 14631 in the 1988–1989 Johnson Matthey/AESAR Group Catalog (Seabrook, N.H.). The particle size distribution of the titania should be such that substantially all of its particles will pass a 325 mesh screen and thus be smaller than 53 microns.

In addition to the titania, an aluminum component is used in the process. This aluminum component is prepared from an aluminum material which is treated in order to activate it and thus form the aluminum component.

The aluminum material used in the process of this invention, from which the aluminum component is prepared, is selected from the group consisting of aluminum and aluminum alloys. Such aluminum material should preferably be in powder form and have a specific surface area of from about 0.2 to about 1.1 square meters per gram and, more preferably, from about 0.6 to about 0.8 square meters per gram.

Either pure aluminum, aluminum alloy material, or mixtures thereof may be used as the aluminum material. Suitable aluminum alloys include, for example, alloys of aluminum with lithium, silicon, magnesium, iron, and the like.

In one embodiment, the aluminum material used is in the form of fine aluminum flakes. Thus, by way of illustration, one may use fine aluminum flakes obtainable from the Riedel de Haen Company of West Germany.

In determining the amount of aluminum material to be used in the invention, the specified weight ratio of aluminum material is based upon the weight of pure aluminum. When an aluminum alloy material is used, or when a mixture of aluminum or aluminum alloy material is used, the aluminum content of the alloy is first calculated, and this aluminum content may then be used to determine the aluminum content in the material.

The particle size distribution of the aluminum material will range from about 4 to about 28 microns and, preferably, from about 6 to about 12 microns. Particle size analysis may be conducted by means well known to those skilled in the art. Thus, e.g., one may use the procedure described on pages 8-2 to 8-8 of Perry and Chilton's "Chemical Engineer's Handbook," Fifth Edition (McGraw-Hill Book Company, New York, 1973). This book also describes the specific surface area test mentioned elsewhere in this specification (see, e.g., page 8-7). The disclosure of this Perry and Chilton book is hereby incorporated by reference into this specification.

At least about 80 weight percent of the aluminum particles will have diameters of from about 6 to about 12 microns. It is preferred that at least about 85 weight percent of the aluminum particles have a diameter of from about 6 to about 12 microns. It it is most preferred that at least about 90 weight percent of the aluminum particles have a particle size of from about 6 to about 12 microns.

The aluminum material described above may be used to prepare the aluminum component. From about 19 to about 35 weight percent of such aluminum component (by total weight of titania, aluminum component, and carbon) is used in the process. It is preferred to use from about 21 to about 33 weight percent of aluminum component.

The aluminum component is an activated aluminum material which has been modified in such a manner such that its ignition temperature is lower after modification than prior to modification. Without wishing to be bound to any particular theory, applicant believes that the activation process destroys part or all of the layer of alumina present on the surface of the aluminum grains.

One preferred means of activating the aluminum material is to comminute it with a metal fluoride in a high energy mill. The term high energy mill, as used in this specification, includes high speed rotary ball mills, vibratory ball mills, jet mills, attrition mills, high speed hammer mills, and the like. The function of each of these comminution means is to introduce mechanical energy into the material through an increase of surface energy and stored elastic strain energy and to increase the density of contact points between the reactants.

The mill may be a vibratory mill. Vibratory mills are described on pages 8-29 to 8-30 of said Perry and Chilton's "Chemical Engineers' Handbook," supra.

The mill may be a high-speed tumbling mill; see, e.g., pages 8-25 to 8-29 of said "Chemical Engineers' Handbook."

One preferred tumbling mill is a ball mill. Thus, e.g., the mill may be a centrifugal ball mill such as, e.g., the ball mills described in sections 7 and 10 of catalog R1, Brinkman Instruments Company, Cantiague Road, Westbury, N.Y.

When one uses either a high speed ball or a vibratory mill, it is preferred to use grinding media with a density of at least about 6.0 grams per cubic centimter. Thus, e.g., one may use zirconia media, stainless steel media, tungsten carbide media, and the like. The weight/weight ratio of the grinding media/material should be at least about 6/1.

A mixture of the aluminum material and metal fluoride is comminuted in the mill. The milling may be continued until the major aluminum reflection (X-ray diffraction) in the mixture has shifted at least about 0.1 degree from its time zero position.

Once the aluminum material and the metal fluoride have been charged to the mill and briefly mixed, X-ray diffraction analysis with internal standard may be conducted on a sample of the "time zero" comminution to determine the position of the major aluminum reflection in the sample.

The term X-ray diffraction rrefers to the reflection of definite and characteristic angles from space lattices of crystal of X-rays which have been caused to bombard them, thus giving data for identification of characteristics lattice structure of a given species of material. The X-ray diffraction technique is well known to those skilled in the art. See, e.g., pages 652–658 of Volume 14 of the McGraw-Hill Encyclopedia of Science & Technology (McGraw-Hill Book Company, New York, 1977), the disclosure of which is hereby incorporated by reference into this specification.

The procedure for evaluating the shift of the major aluminum peak is described, e.g., in D. Becherescu et al.'s "Physical Methods in the Chemistry of Silicates," published in Romanian (Scientific and Encyclopedic Publishing House, Bucharest, Romania, 1977) at pages 32–37, and in the references cited at pages 132–133 of this book; the disclosure of each of these references is hereby incorporated by reference into this specification.

In one preferred embodiment, the X-ray diffraction analysis is conducted on Siemens D-500 Diffractometer (model number C7722980A223-B-9-POZ-288, manufactured by the Siemens Company of West Germany) using copper K-alpha radiation and a diffracted beam graphite monocrometer.

After the "time zero" X-ray diffraction analysis has been conducted, the mixture is comminuted in the mill. Samples of the mixture may be periodically withdrawn from the mill and subjected to X-ray diffraction analysis with internal standard to ascertain the position of the major aluminum reflection in the sample. When analysis reveals that the major aluminum reflection has shifted at least 0.1 degree from its time zero position, the comminution may be stopped.

The mixture comminuted in the mill is comprised of the aforementioined aluminum material and metal fluoride. The metal fluoride is preferably selected from the group consisting of sodium fluoride, sodium hydrogen fluoride, potassium fluoride, potassium hydrogen fluoride, lithium fluoride, and mixtures thereof. In general, from about 5 to about 15 weight percent of the metal fluoride (by total weight of metal fluoride and aluminum material) are comminuted for at least about one hour.

When a high-speed tumbling mill is used to comminute the mixture of the metal fluoride and the aluminum material, it is preferred to comminute the mixture for at least about 1 hour and, more preferably, for from about 1 to about 3 hours. When a vibratory mill is used to comminute such mixture, it is preferred to comminute the mixture for from about 6 to about 18 hours.

Another preferred means for activating the aluminum material is to leach the alumina layer from it with one or more acids or mixture of acids which will dissolve alumina. This leaching process is well known to those in the art; see, e.g., pages 375–410 of J. M. Coulson et al.'s "Chemical Engineering," Volume Two, Third Edition (Pergammon Press, Oxford, England, 1978), the disclosure of which is hereby incorporated by reference into this specification. Thus, e.g., one may use as a leaching mixture a blend of chromic acid and sulfuric acid, a blend of phosphoric acid and sulfuric acid, and the like. The leaching operation is preferably conducted under inert environment (argon, krypton, or helium) or under vacuum. One may use ambient temperature conditions. Alternatively, one may use elevated temperature conditions as long as they do not exceed the boiling point of the acid or acid mixture.

In another embodiment, the aluminum material is activated by heat treating it. In this embodiment, the aluminum material is subjected to a temperature of from about 400 to about 500 degrees centigrade while it is under a protective environment. The term protective environment, as used in this specification, refers either to a specified inert environment or a specified vacuum. The inert environment may consist essentially of argon, krypton, helium, or mixtures thereof. The vacuum will range from about $10^{-2}$ to about $10^{-3}$ Torr.

Other means for providing an activated aluminum material known to those skilled in the art may be used, as long as one produces a material with the specified reduced ignition temperature. Thus, the term activated aluminum material, as used in this specification, refers to a material which, in mixture with a specified silica, has an ignition temperature below 660 degrees centigrade. In order to determine whether a particular aluminum material is activated, 19 grams of the aluminum material are mixed with 32 grams of "NEOSIL A" silica, a white, microcrystalline extender pigment available from Johnson Matthey/AESAR Group, Materials Technology Disision, Seabrook, N.H. This NEOSIL A silica contains 98.951 percent of silicon dioxide, 0.044 percent of iron oxide, 0.411 percent of aluminum oxide, 0.027 percent of calcium oxide, and 0.015 percent of magnesium oxide. It has a loss on ignition of 0.463 percent.

The mixture of the aluminum material and the silica is introduced into a differential thermal analysis furnace, and a differential thermal analysis is performed. As is known to those skilled in the art, differential thermal analysis is an instrumental means of tracing the temperature of a sample while its container is heated at a constant rate; and it discloses endothermic and exothermic processes occurring in the sample such as, e.g., decomposition, phase changes, combustion, etc. Differential thermal analysis is discussed, e.g., on page 138 of J. T. Jones et al.'s "Ceramics: Industrial Processing and Testing," (The Iowa State University Press, Ames, Iowa, 1972).

If the differential thermal analysis reveals that the aforementioned mixture has an ignition temperature of less than 660 degrees centigrade, then the aluminum material in such mixture is "activated" within the meaning of this specification.

From about 19 to about 35 weight percent of the aluminum component is used in the process of the invention. It is preferred to use from about 21 to about 33 weight percent of the aluminum component. It is more preferred to use form about 23 to about 30 percent of the aluminum component.

In the process of the invention, in addition to the titania and the aluminum component, amorphous carbon also is used. From about 9 to about 15 weight percent of such amorphous carbon (by total weight of titania, aluminum component, and amorphous carbon) is used. It is preferred to use from about 10 to about 14 percent of the amorphous carbon. One may obtain amorphous carbon from, e.g., Aldrich Chemical Company, Inc. of Milwaukee, Wis. (sold as code 27,720-7 in the 1988-1989 Aldrich catalog).

The amorphous carbon preferably has a specific surface area of at least about 4 square meters per gram. The specific surface area may be determined by means well known to those skilled in the art such as, e.g., by using gas adsorption techniques via the well known BET equation. This measurement can be conducted on a Micromeritics Flo Sorb II 23000, model 2300/0000/000 (made by Micromeritics Company, Norcross, Ga.). The test procedure is described in the instruction manual for the machine (see, e.g., Manmual P/N: 230/42804/00, published by Micromeritics in 1985).

In one preferred embodiment, the amorphous carbon contains less than about 1.5 weight percent, by weight of carbon, of combined sulfur. The amount of combined sulfur may be determined by well known means. Thus, e.g., one may use the combustion method described on pages 9-4 and 9-5 of Perry and Chilton's "Chemical Engineers' Handbook."

The mixture of titania, activated aluminum component, and amorphous carbon is comminuted in a high energy mill under protective environment; any of the high energy mills described elsewhere in the specification may be used. In general, the mixture is comminuted for at least about 1 hour.

If the high energy mnill is a rotary mill, it is preferred to comminute the mixture for from about 1 to about 3 hours. If the high energy mill is a vibratory mill, it is preferred to comminute the mixture for from about 6 to about 18 hours.

In general, the reaction mixture is comminuted in the high speed mill while under protective environment until analysis reveals that it is comprised of substantially a single phase material, as shown by scanning electron microscopy. A sample of the mixture in the mill may be periodically removed and analyzed by a scanning electron microscope to determine whether it consists essentially of only one phase.

As used in this specification, the term phase refers to a separate, but homogeneous, fraction of a system. The use of a scanning electron microscope to determine the number of phases in a ceramic material is well known to those in the art. See, e.g., pages 443–456 of Volume 8 of the "McGraw-Hill Encyclopedia of Science and Technology," supra, and J. T. Jones et al.'s "Ceramics: Industrial Processing and Testing," supra. The disclosure of each of these publications is hereby incorporated by reference into this specification.

In one preferred embodiment, prior to the comminution of the mixture in a high energy mill, from about 0.1 to about 0.5 weight percent of surfactant is added to the mixture.

As used in this specification, the term surfactant refers to a surface active agent, i.e., a substance that alters energy relationships at interfaces. It is preferred that the surfactant be a synthetic or natural organic compound which is liquid and which is selected from the group consisting of anionic surfactants, cationic surfactants, and nonionic surfactants. Some suitable surfactants are described in U.S. Pat. No. 4,477,259 of Funk, the disclosure of which is hereby incorporated by reference into this specification.

In one preferred embodiment, the surfactant is anionic, and its solubilizing group(s) is preferably a carboxylate group. In another embodiment, the surfactant is cationic, and its solubilizing group(s) is selected from the group consisting of a primary amine group, a secondary amine group, a teriary amine group, a quaternary amine group, and mixtures thereof.

In one preferred embodiment, the surfactant is a carboxylic acid containing from about 4 to about 26 carbon atoms. One preferred class of carboxylic acids is the saturated fatty acids containing from from about 4 to about 26 carbon atoms. Another preferred class of carboxylic acids is the unsaturated fatty acids containing from about 4 to about 24 carbon atoms. The most preferred fatty acid is oleic acid.

The comminution is conducted under protective environment until a substantially single phase material is formed. Thereafter, the mixture is then discharged from the high energy mill and pelletized.

The comminuted mixture may be pelletized by any means well known to those skilled in the art. Thus, e.g., one may use the methods and apparatuses described on pages 8-61 and 8-62 of Perry and Chilton's "Chemical Engineers' Handbook," supra. Thus, one may use the methods described in brochures GM 885-5e ("Eirich Intensive Mixers: The Complete Range of Mixers"), 1041 us-2000-683 ("The importance of specific mixing energy in mixing plants"), and 1051e-50000-180 ("Pelletizing Methods and Applications"), each of which is obtainable from Eirich Machines, Inc. of Uniontown, Pa.

In one embodiment, the material is pelletized by pressing it into small pellets whose minimum size is at least about 0.25 inches. The pellet may be in the shape of a cylinder, a bar, a disc, etc.; alternatively, it may have an irregular shape.

In this embodiment, a conventional press may be used. Thus, e.g., one may use a hydraulic press such as, e.g., a press comprised of hydraulic pumps connected to plungers. By way of illustration and not limitation, one may use a single-action Carver Lab Press 13-872 (see page 897 of the Fischer '88 Catalog, Fischer Scientific Company, Pittsburgh, Pa.) together with a cylindrical die.

The pressed pellets may then be charged into a reactor in which they are self-ignited under protective environment. The pellets are placed in the reactor and heated to a temperature of from about 600 to about 900 degrees centigrade until ignition occurs. In one embodiment, the pellets are charged to a graphite boat, and the graphite boat assembly is then heated in the reactor until ignition occurs.

In one embodiment, the furnace into which the pellets are to be ignited is first preheated to a temperature of from about 250 to about 400 degrees centigrade prior to the time the pellets are placed in the furnace. Thereafter, the furnace is purged with inert gas and/or subjected to vacuum, and the temperature is raised until ignition occurs.

The combusted pellets are then allowed to cool to ambient temperature. The cooled, combusted pellets are then crushed. It is preferred to crush the pellets in a roller mill. The pellets are crushed so that substantially all of their particles are within the range of from about 0.1 to about 0.5 millimeters. Any suitable roll crusher can be used. Thus, one may use a roll crusher having smooth rolls. Medium peripheral speed mills (such as ring roll mills, bowl mills, roll mills, etc.) may be used; see, e.g., page 8-22 of said "Chemical Engineers' Handbook."

In one preferred embodiment, the crushed material is then passed to a ball mill in which it is milled until at least about 95 weight percent of its particles are smaller than 53 microns.

The crushed material and/or the ground material is a composite which is comprised of at least about 35 weight percent of titanium carbide, at least about 53 weight percent of alumina, less than about 8 weight percent of titanium, less than about 2 weight percent of titanium nitride, and less than about 2 weight percent of titanium dioxide. The titanium carbide component of this composite generally contains at least about 21 weight percent of total carbon (the total of the combined and uncombined carbon); however, less than about 2 weight percent of the titanium carbide component is free, uncombined carbon.

The crude composite material may then be thermally conditioned. One may use any suitable furnace such as, e.g., a pusher type furnace or a batch type furnace. Thus, for example, one may use any of the heat-treating furnaces described on pages 148–151 of S. Kalpakjian's "Manufacturing Engineering and Technology" (Addison-Wesley Publishing Company, Reading, Mass., 1989).

In one embodiment, the heat-treating furnace is a batch furnace consisting of an insulated chamber, a heating system, and an access door or doors.

After the composite material is in the heat-treating furnace, it is subjected to a temperature of from about 800 to about 1,400 degrees centigrade for at least about 0.5 hours. It is preferred to use a heat-treating temperature of from about 900 to about 1,100 degrees centigrade.

The heat-treatement reduces the amount of titanium nitride, titanium oxide, and titanium. The heat-treated material generally contains at least about 44 weight percent of titanium carbide, at least about 45 weight percent of alumina, and less than 2.0 weight percent of material selected from the group consisting of titanium nitride, titanium oxide, titanium, and mixtures thereof. The total amount of carbon, both free and combined, in the titanium carbide component of the the composite material is at least about 19 weight percent; however, the amount of free, uncombined carbon in the titanium carbide component is less than about 0.5 weight percent.

PREPARATION OF A MATERIAL CONTAINING TITANIUM CARBIDE WHISKERS

In this embodiment of the invention, a composite material comprised of titanium carbide whiskers is prepared.

The term whisker refers to a needle-like, single crystal of metallic and nonmetallic compounds. The aspect ratio of the whisker is the ratio of its diameter (or its equivalent diameter) divided by its length.

The material produced in this embodiment of the invention is comprised of at least about 35 weight percent of titanium carbide whiskers with a length of from about 15 to about 80 microns and an aspect ratio of from about 10 to about 25.

In this process, from about 19 to about 29 weight percent of aluminum material (by weight of aluminum material, titania, and carbonaceous material) is mixed with titania and carbonaceous material to make a slurry, the slurry is then pelletized, and the pellets are then ignited. It is preferred to use from about 21 to about 27 weight percent of the aluminum material. In a more preferred embodiment, it is preferred to use from about 23 to about 25 weight percent of the aluminum material.

The aluminum material used to make the slurry is identical to the aluminum material described for the prior embodiment of the invention, but it need not be identical.

In addition to the aluminum material, from about 62 to about 85 weight percent of titania is used to make the slurry. It is preferred to use from about 65 to about 80 weight percent of titnania, and it is more preferred to use from about 70 to about 75 weight percent of titania.

A carbonaceous material is also used to prepare the slurry. From about 16 to about 21 weight percent of the carbonaceous material (by weight of carbonaceous material, aluminum material, and titania) is used. It is preferred to use from about 17 to about 20 weight percent of carbonaceous material; and it is even more preferred to use form about 18 to about 19 weight percent of carbonaceous material.

The carbonaceous material used to prepare the slurry is comprised of from about 65 to about 75 weight percent of amorphous carbon, from about 20 to about 26 weight percent of a source of hydrogen fluoride, from about 0.2 to about 1 weight percent of a source of carbon monoxide, and from about 3 to about 7 weight percent of a metal containing component. In one preferred embodiment, the carbonaceous material also is comprised of from about 1.5 to about 2.5 weight percent of a source of magnesium oxide.

In this embodiment of the invention, the carbonaceous material is activated.

Amorphous carbon comprises from about 65 to about 75 weight percent of the carbonaceous material. One may use any of the well known amorphous carbon materials. Thus, e.g., one may use the carbon black obtainable from the Pelleter Company of the United States (code "SRF") which has a specific surface area of 27.1 square meters per gram and is comprised of 99.28 percent of carbon, 0.37 percent of hydrogen, 0.03 percent of sulur, 0.25 percent of ash, and 0.07 percent of oxygen.

The carbonaceous material is preferably comprised of from about 20 to about 26 weight percent of a source of hydrogen fluoride; it preferably comprises from about 22 to about 24 weight percent of a source of hydrogen fluoride. The source of hydrogen fluoride must generate hydrogen fluoride when subjected to a temperature of from about 200 to about 400 degrees centigrade for from about 1 to about 20 minutes.

Suitable sources of hydrogen fluoride include, e.g., potassium hydrogen fluoride, sodium hydrogen fluoride, ammonium hydrogen fluoride, and the like. As is known to those skilled in the art, these materials, and others which contain the bifluor ion ($HF_2$) are suitable sources of hydrogen fluoride.

The carbonaceous material preferably is also comprised of from about 3 to about 7 weight percent of a metal-containing component selected from the group consisting of ferric oxide, ferro-ferric oxide, manganese dioxide, molybdenum oxide, and mixtures thereof. It is preferred that the metal containing component be selected from the group consisting of ferric oxide and manganese dioxide and that it comprise from about 4 to about 6 weight percent of the carbonaceous material. One suitable ferric oxide is obtainable from the Research Organic/Inorganic Chemical Corp. of Sun Valley, Calif.

The carbonaceous material also is preferably comprised of from about 0.2 to about 1 weight percent of a source of carbon monoxide. In a more preferred embodiment, the carbonaceous material is comprised of from about 0.4 to about 0.8 weight percent of the source of carbon monoxide.

The source of carbon monoxide must generate carbon monoxide when it is subjected to a temperature of from about 700 to about 1,600 degrees centigrade for no more than about 1 millisecond. Suitable sources of carbon monoxide include fatty acids containing from about 10 to about 24 carbon atoms such as, e.g., monocarboxylic and dicarboxylic acids. By way of illustration, suitable fatty acids include caprylic acid, capric acid, lauric acid, myristic acid, palmitic acid, stearic acid, oleic acid, linoleic acid, erucic acid, brasidic acid, elaidic acid, stearolic acid, mixtures thereof, and the like. Other sources of carbon monoxide include fats corresponding to such acids.

In one preferred embodiment, the carbonaceous material also is comprised of from about 1.5 to about 2.5 weight percent of a source of magnesium oxide. The source of magnesium oxide will generate magnesium oxide at a temperature of about 700 degrees centigrade. By way of illustration and not limitation, suitable sources of magnesium oxide include, e.g., magnesium oxide, magnesium carbonate, magnesium bicarbonate, magnesium chlorate, and elemental magnesium.

The carbonaceous material may be prepared by grinding the amorphous carbon, the source of hydrogen fluoride, and whatever other constituents may be present (such as the metal-containing component and/or the source of carbon monoxide and/or the source of magnesium oxide) to homogenize the mixture and slightly agglomerate it. Thus, for example, the mixture can be ground for from about 1 to about 2 hours with alumina grinding media. Alternatively, the source of carbon monoxide and/or the source of magnesium oxide may be separately comminuted later together with the titania, the aluminum material, and the carbonaceous material.

The mixture of aluminum material, titania, and carbonaceous material is comminuted in a high energy mill under protective environment until a substantially single phase material is produced. The comminution conditions and apparatuses described elsewhere in this specification with regard to the first embodiment of the invention may be used in this embodiment.

Figure 1:
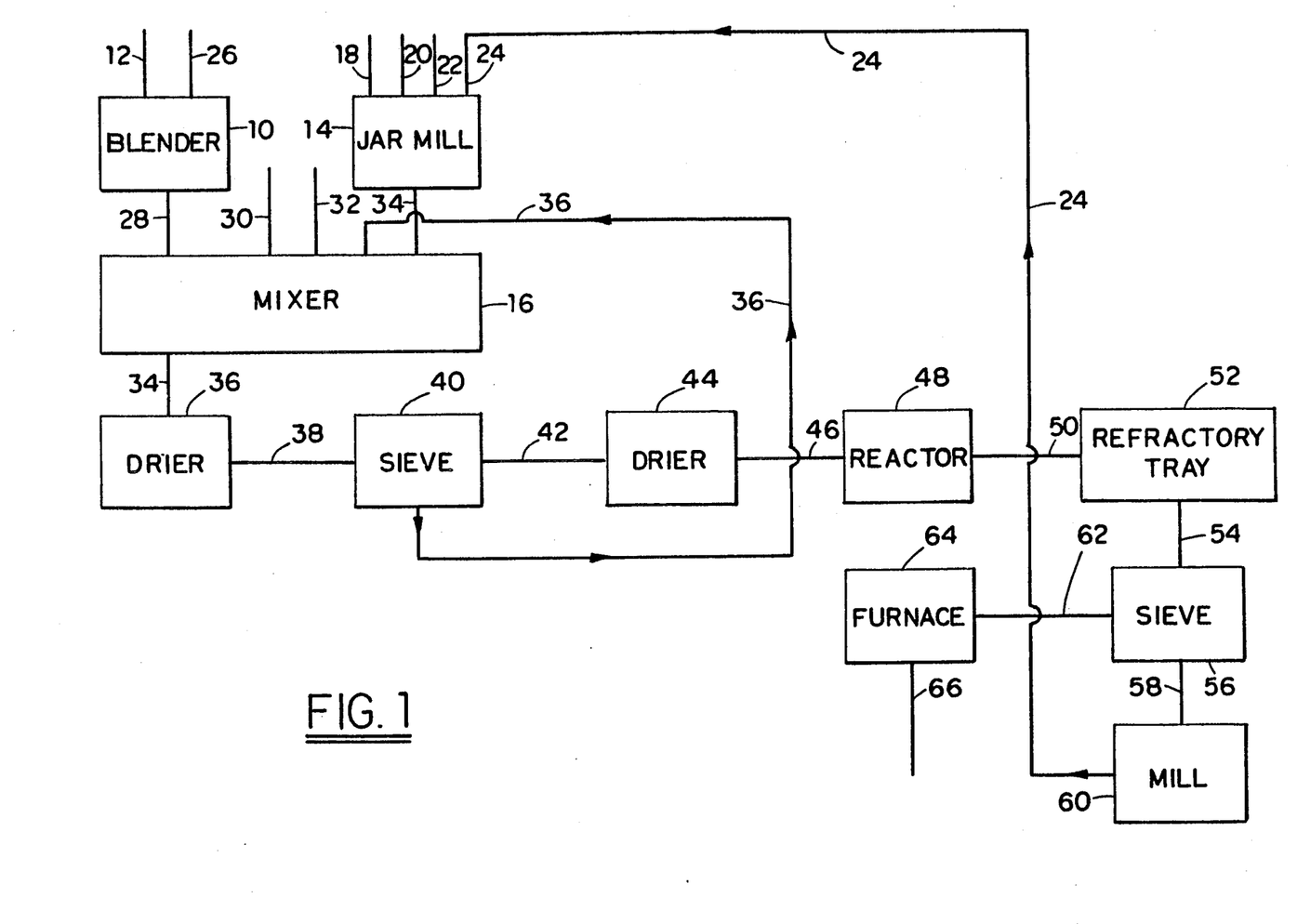
FIG. 1 is a flow sheet illustrating a process in which a titanium carbide whisker/alumina composite is produced.

In one embodiment, illustrated in FIG. 1, an especially preferred process for preparing the pellets which are combusted in this embodiment is used. In the first step of the process, a slurry is provided which is comprised of from about 60 to about 80 volume percent of solid material and from about 40 to about 20 volume percent of nonaqueous liquid. The solid material in the slurry comprises from about 19 to about 29 weight percent of said aluminum material, from about 16 to about 21 weight percent of said carbonaceous material, and from about 62 to about 85 weight percent of said titania. The slurry is preferably prepared by a process involving the sequential steps of mixing a nonaqueous liquid with a source of carbon monoxide, mixing titania with the nonaqueous liquid/carbon monoxide source mixture to produce a titania slurry, mixing aluminum material and carbon with the titania slurry, and drying the titania/alumina/carbon slurry thus produced to a solids content of from about 80 to about 92 volume percent.

The first step in making the slurry is to mix nonaqueous liquid with a source of carbon monoxide. The nonaqueous liquid is preferably readily volatile at a temperature of about 80 degrees centigrade. This nonaqueous liquid may be either a flammable or a nonflammable solvent. In one embodiment, the nonaqueous liquid volatilizes at a temperature of about 60 degrees centigrade.

In one embodiment, nonflammable, nonaqueous solvents are used. Such solvents include tetrachlorocarbon, carbon disulfide, and the like.

Suitable flammable, nonaqueous solvents include acetone, benzene, toluene, n-petroleum ether, and the like. Thus, e.g., one may use the petroleum ethers identified as reagents 32,044-7, 30,031-4, and 18-451-9 in the 1988-1989 Aldrich catalog. In a preferred embodiment, 200 milliliters of the petroleum ether may be charged to blender 10 by line 12.

In the embodiment illustrated in FIG. 1, a carbonaceous material is prepared in jar mill 14, a nonaqueous solvent/carbon monoxide source is mixed in blender 10, and the components of the slurry produced are fed to mixer 16.

A carbon agglomerate is prepared in jar mill 14. To jar mill 14 is fed amorphous carbon via line 18, ferric oxide via line 20, and potassium hydrogen fluoride via line 22. Other mills may be used instead of jar mill 14; thus, e.g., one may use the mills described on pages 8-25 to 8-45 of said "Chemical Engineers' Handbook."

The carbon may be mixed with any source of metal-containing component, any source of hydrogen fluoride, and any moderator until a homogeneous carbon agglomerate is obtained in the mill. In this step, the carbon, the source of metal-containing component, and/or the source of moderator, and/or the source of hydrogen fluoride, and/or the source of magnesium oxide, are comminuted in the mill. It is preferred to homogenize these materials for from about 1 to about 2 hours in a jar mill with alumina grinding media.

One amorphous carbon which can be used is Huber Corporation's pelletized carbon black, type N990; in the preferred embodiment illustrated above, 10 grams of such carbon is charged to mill 14 via line 18. One ferric oxide which can be used is Pfizer Corporation's synthetic iron oxide type R-2100; in the preferred embodiment, 0.5 grams of this ferric oxide is charged via line 20. One potassium hydrogen fluoride is Aldrich Corporation's reagent number 23,928-3 (also referred to as potassium bifluoride); in the preferred embodiment, 3.0 grams of this reagent is charged to mill 14 via line 22.

In one embodiment, a ground moderator is fed to mill 14 via line 24. The moderator may be titanium carbide. One may use a moderator which tends to remain the final product such as calcined alumina, magnesia, zirconia, molybdenum oxide, composite materials comprised of alumina, and mixtures of titanium of carbon. Alternatively, one may use moderators which tend to leave the system during reaction or by washing such as, e.g., chlorides of alkali, alkaline, or alkaline earth metals, fatty acids, and the like.

A discussion moderators which is contained on pages 37-39 of applicant George T. Hida's "Research Proposal for Doctor's Degree" entitled "Study of Solid State Aluminothermal Reactions: Influence of Activation and Moderation Processes" which was submitted to the Technicaon—Israel Institute of Technology, Haifa, Israel in November, 1984; the disclosure of this research proposal is hereby incorporated by reference into this specification.

In one embodiment, a moderator is used which contains from about 1 to about 10 weight percent (by weight of moderator) of a fatty acid such as, e.g., oleic acid. It should be noted that oleic acid, e.g., can act as both a moderator (added in mill 14) and/or a source of carbon monoxide (added in blender 10).

It is preferred that jar mill 14 contain sintered alumina grinding media. The reagents in jar mill 14 should be ground for about 2 hours at a speed of about 90 revolutions per minute to produce a substantially homogeneous mixture. Into blender 10 should be charged a nonaqueous solvent such as, e.g., petroleum ether via line 12. A fatty acid, such as stearic acid, may be fed into blender 10 via line 26. It is preferred to prepare a nonaqueous solvent/stearic acid mixture prior to the time the titania is mixed with the nonaqueous solvent.

One stearic acid which may be used is obtainable form Aldrich Corporation and is identified as reagent 17-536-6; in the preferred embodiment, 4 grams of this fatty acid are charged to blender 10. The petroleum ether and the stearic acid are preferably blended at a speed of about 1,500 r.p.m.

After the mixture of nonaqueous solvent and stearic acid has been prepared in blender 10, it is thereafter mixed with titania. All of the titania is mixed with a sufficeint amount of the mixture to prepare a well dispersed titania slurry with a solids content of from about 35 to about 55 volume percent and, preferably, from about 40 to about 50 volume percent. In one embodiment, the mixing occurs for from about 10 to about 30 minutes. One may use any of the mixing means known to those skilled in the art such as, e.g., those processes and apparatuses described on pages 21-30 to 21-36 of Perry and Chilton's "Chemical Engineers' Handbook," supra. The, e.g., one can mix the titania and the solvent mixture with an Eirich mixer.

Into the mixer vessel 16 is fed the blend from blender 10 via line 28, titania via line 30, aluminum material (aluminum powder) via line 32, the ground mixture from mill 14 via line 34, and recycled material via line 36. The term recycled material, as used herein, refers to the material which passes through the pelletizing sieves and has a diameter less than 4 millimeters.

In this embodiment, 200 millimeters of the mix from blender 10 are mixed with 60 grams of titania. The mixing may occur in a mixer other than mixing vessel 16. Suitable mixers are described on pages 19-3 to 19-23 of said "Chemical Engineers' Handbook." In one embodiment, mixing occurs at 160 r.p.m. for about 30 minutes.

After a well-dispersed titania slurry has been prepared, it may be mixed with aluminum powder, which is added via line 32. A suitable aluminum powder is Alcoa Corporation's atomized aluminium powder grade 1401T. In the preferred embodiment, 18 grams of the powder are added.

At the same time the aluminum powder is added, or thereafter, the carbon agglomerate mixture from mill 14 may be added thorugh line 34 and/or the recyled material may be added through line 36. In general, up to about 20 grams of recyled material may be added through line 36.

In one embodiment, mixer 36 is a closed vessel and, preferably, also is leakproof.

The titania/aluminum/carbon agglomerate/solvent mixture thus prepared is then preferably mixed for at least about 2 hours and, preferably, from about 2 to about 4 hours. In one preferred embodiment, mixing is conducted at a speed of 160 r.p.m. for about 4 hours.

Once all of the reagents have been added to mixer 16 and mixed, they may be discharged via line 34 to drier 36 and partially dried to a moisture content of from about 8 to about 20 percent, by weight, and, preferably, from about 12 to 16 percent. Any conventional drier may be used. Thus, e.g., one may use the driers described on pages 20-4 to 20-58 of the "Chemical Engineers' Handbook," Fifth Edition, supra.

The partially dried slurry may then be pelletized by conventional means. Thus, one may use the means described on pages 8-61 to 8-62 of said "Chemical Engineers' Handbook." One may use Eirich mixers. One may use a wet mixing process.

Separation of solids by screening and sieving is well known; see, e.g., pages 21-37 to 21-44 of the "Chemical Engineers' Handbook." The size of the sieve openings dictates the size of the pellets obtained from the partially dried slurry.

In the embodiment illustrated in the Figure, the partially dried slurry is passed via line 38 to twin vibratory sieve 40 in which it is pelletized. Two sieves are used in this embodiment. The slurry is first passed through a top sieve with sieve openings of from about 8 to about 14 millimeters and, preferably, from about 10 to about 12 millimeters. The slurry which passes through this top sieve is then contacted with a bottom sieve with sieve openings of 4 milimeters. The pellets used in the process are formed between the top sieve and the bottom sieve. The material passing the bottom sieve of sieve 40 can be recycled via line 36 into mixer 16 and reslurried.

The pelletized material from sieve 40 is passed by line 42 to drier 44, wherein it is dried to a moisture content of from about 0.1 to about 2.0 percent. In general, the pellets are dried at a temperature of from about 80 to about 100 degrees centigrade for about 2 hours.

The dried pellets are then transferred via line 46 to reactor 48; the reactor is equipped with an igniter and a source of protective environment. In one preferred embodiment, the pellets are subjected to a heat treatment step prior to ignition.

In the preheating step, which is preferably conducted under protective environment, the dried pellets are poured into the reactor and heated to a temperature of from about 200 to about 300 degrees centigrade; it generally takes no longer than about 40 minutes before the pellets reach this temperature. Preheating is usually conducted for from about 10 to about 40 minutes and, preferably, from about 15 to about 25 minutes. In one preferred embodiment, the protective environment is selected from the group consisting of argon, helium, and mixtures thereof.

Once the pellets have been preheated, they may be ignited. Any suitable source of heat, such as a spark, a flame, a beam, a hot wire, and the like can be used to ignite. In general, the ignition source should be at a temperature of from about 600 to about 900 degrees centigrade.

Once the pellets have been ignited, they burn spontaneously. In general, the reaction wave propagates at a rate of from about 0.1 to about 1.5 centimeters per second. The reaction temperature is generally from about 1,700 to about 2,300 degrees centigrade.

In one preferred embodiment, the pellets are ignited with a chromel-alumel hot wire at a temperature of at least about 800 degrees centigrade.

The combusted pellets are then discharged via line 50 to refractory tray 52 on which they are allowed to cool. The cooled pellets are then passed via line 54 to four-deck vibratory sieve 56. This vibratory sieve preferably has at least four sieves which sequentially screen and/or treat the combusted pellets, and it also has a collecting pan beneath the finest sieve.

The first screen in the vibratory sieve, into which the combusted pellets are first discharged, is 2.5 mesh (8 millimeters sieve opening). Material which passes through this sieve is then passed to a second vibratory sieve.

The second screen is 16 mesh (1 millimeter sieve opening). It is preferred to locate rubber rings in the bottom of this sieve; these rings are solid rubber and are about 1 inch in diameter. The rubber rings gently crush the pellet material. Material which passes through the second sieve is passed to the third screen.

The third screen is 28 mesh (0.6 millimeter opening). The bottom of this sieve also contains 1.0 inch diameter solid rubber rings. Material which passes through this third sieve is primarily titanium carbide whisker material and alumina powder and alumina agglomerates; and it passes to the fourth sieve.

The fourth vibratory sieve is 60 mesh (0.25 millimeters opening). The material which passes through this sieve and collects on the bottom pan is a mixture of titanium carbide whiskers dispersed in alumina powder; it comprises at least about 25 weight percent of titanium carbide whiskers whose length is from about 15 to about 80 microns and whose aspect ratio is from about 10 to about 25, at least about 53 weight percent of alumina, less than about 8 weight percent of titanium, less than about 2 weight percent of titanium nitride, and less than about 2 weight percent of titanium dioxide. In one preferred embodiment, the composite material also is comprised of from about 0.1 to about 0.3 weight percent of magnesium oxide. The titanium carbide component of this composite contains at least about 21 weight percent of total carbon; however, less than about 2 weight percent of this component is free carbon.

If the material remains on the first sieve and/or the second sieve and/or the third sieve, it may be passed via line 58 to mill 60, wherein it is ground, preferably with about 0.1 weight percent of oleic acid, until it will pass a 325 mesh screen, and the ground material is then passed via line 24 to jar mill 14. Alternatively, the materials remaining on the first sieve and/or the second sieve and/or the third sieve and/or the fourth sieve can be used as moderator material in mill 14.

In one preferred embodiment, the material remaining on the fourth sieve is passed by line 62 to furnace 64 to be heat treated. Furnace 64 is equipped with a source of protective environment 66. The material is charged to this furnace and heated under protective environment to a temperature of from about 800 to about 1,400 degrees cenitgrade for at least about 0.5 hours. It is preferred to use a temperature of from about 900 to about 1,100 degrees centigrade.

The heat treatment reduces the amount of impurities in the material. The heat-treated material contains at least about 45 weight percent of titanium carbide, and at least about 35 weight percent of the heat treated material is in the form of titanium carbide whiskers. The heat treated material also comprises at least about 53 weight percent of alumina and no more than 2 weight percent of material selected from the group consisting of titanium nitride, titanium oxide, titanium, and mixtures thereof. The total amount of carbon, both free and combined, in the titanium carbide component of the composite is at least about 20 weight percent; however, the amount of free, uncombined carbon in the titanium carbide component is less than about 0.5 weight percent.

PREPARATION OF A TITANIUM CARBIDE/ALUMINA MONOLITHIC BODY

The process used in this embodiment is similar to the process described in the first embodiment, but lesser amounts of the metallic fluoride compound are used to activate the aluminum material and prepare the aluminum component. In general, from about 1 to about 5 weight percent of the metallic fluoride is mixed with the aluminum.

Figure 2:
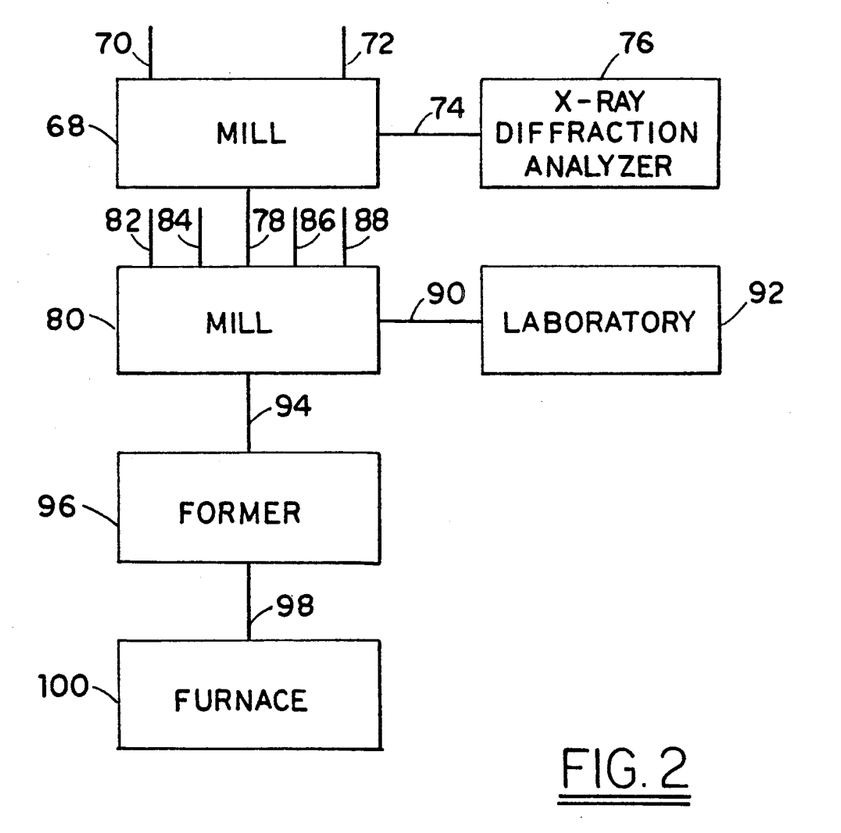
FIG. 2 is a flow sheet illustrating the preparation of a sintered product produced by reaction-sintering.

A preferred embodiment of the process is illustrated in FIG. 2. In this embodiment, the aluminum component is prepared in mill 68, to which is charged aluminum material via line 70 and metal fluoride via line 72. From about 1 to about 5 weight percent of metal fluoride, such as sodium fluoride, is charged to mill 68 together with the aluminum component, and the components are briefly mixed. Thereafter, a sample of the "time zero" mixture is passed via line 74 to X-ray diffraction analyzer 76, and the position of the major aluminum reflection in the sample is determined.

After this "time zero" determination, the mixture is comminuted in the mill under the conditions specified for the first embodiment of the invention. Samples of the mixture are periodically withdrawn and subjected to X-ray diffraction analysis. When analysis reveals that the major aluminum reflection has shifted at least 0.1 degree from its time zero position, the comminution may be stopped. Thereafter, the activated aluminum component is discharged via line 78 to high energy mill 80.

Titania and amorphous carbon are also added to mill 80, via lines 82 and 84, respectively. From about 50 to about 60 weight percent of titania (by weight of titania, aluminum component, and carbon), from about 20 to about 26 weight percent of the activated aluminum component, and from about 8 to about 10 weight percent of amorphous carbon are added to mill 80. In addition, one may also add to mill 80 from about 0.1 to about 0.5 weight percent of surfactant (via line 86), from about 10 to about 20 weight percent of moderator (via line 88), and/or from about 1.5 to about 2.5 weight percent of magnesium oxide.

The moderator preferably is titanium carbide. This moderator preferably is at least about 99 percent pure and has at least about 90 weight percent of its particles smaller than about 10 microns. One suitable material which may be used as a titanium carbide moderator is identified as catalog number 12143, Johnson Matthey/AESAR Group 1988-1989 catalog.

Mill 80 is equipped with a source of protective environment 88. The reaction mixture is comminuted in mill 80 under protective environment until analysis reveals that at least about 90 weight percent of the mixture comprises agglomerates of at least 50 microns in size. Samples of the reaction mixture may be periodically passed from mill 80 via line 90 to laboratory 92 to evaluate the extent of agglomeration in the mixture.

When a rotary ball mill is used, the mixture usually is comminuted at least about 5 hours. When a vibratory ball mill is used, the mixture is generally comminuted at least about 30 hours.

Once the desired agglomerated mixture has been obtained in mill 80, it is discharged via line 94 to former 96, wherein it is shaped into a green body by conventional means. By way of illustration, one may use single action pressing, cold pressing, cold isostatic pressing, transfer molding, and the like to form the green body. Means for forming green bodies are well known to those in the art and are described in, e.g., pages 329 to 411 of James S. Reed's "Introduction to the Principles of Ceramic Processing" (John Wiley and Sons, Inc., New York, 1988), the disclosure of which is incorporated by reference into this case.

The green body from former 96 is passed via line 98 to furnace 100. Thereafter, while under inert atmosphere (preferably argon or helium), the green body is heated until ignition occurs, generally to a temperature of from about 600 to about 900 degrees centigrade. An exothermic reaction occurs, and a fired body is formed by reaction sintering.

In one preferred embodiment, the green body is buried in a loose powder mixture comprised of titanium dioxide, aluminum component, and carbon; the reagents in the powder mixture are in substantially the same ratio as in the green body. The buried green body is then placed into a graphite reactor and ignited. The "chemical furnace" which results sinters the green body while helping it to maintain its desired shape.

In another embodiment, the green body contains titanium, carbon, and the loose body also contains titanium and carbon.

Ignition of the material can be in a pressureless system or under pressure. In one embodiment, the material is ignited in a hot press die; in this embodiment, the heat is provided by the material, and the die provides the pressure.

PREPARATION OF A COMPOSITE CONTAINING TITANIUM CARBONITRIDE

Each of the embodiments one, two, and three may be modified to form a material containing titanium carbonitride. In these prior embodiments, certain of the steps are conducted under a protective environment, such as inert gas (argon or helium, e.g.) or vacuum. In this embodiment, in each instance where inert gas or vacuum was used in the prior embodiments, nitrogen is substituted. Thus, e.g., the combustion step is conducted under nitrogen rather than vacuum or inert gas.

The composite produced in this embodiment is comprised of titanium carbonitride and alumina and contains at least 12 percent of carbon, at least 7 percent of nitrogen, and less than 0.5 percent of free carbon.

In another embodiment, in addition to replacing the protective environment with nitrogen, part or all of the aluminum component is replaced with a magnesium component selected from the group consisting of magnesium, magnesium alloy, and mixtures thereof; consequently, some or all of the alumina in the final product is replaced by magnesia. One may also replace part or all of the aluminum component and/or the aluminum material with magnesium component in each of embodiments one, two, and three.

The following examples are presented to illustrate the claimed invention but are not to be deemed limitative thereof. Unless otherwise specified, all parts are by weight and all temperatures are in degrees centigrade.

EXAMPLE 1

60 grams of aluminum (catalog number 1401T, Alcoa Aluminum Company) were mixed with 6 grams of anhydrous sodium fluoride (reagent number 21,115-4, 1988-1989 Aldrich catalog) in a centrifugal ball mill (Centrifugal Ball Mill S-1, Brinkman Instruments Company, Cantaigue Road, Westbury, N.Y.) along with 6 tungsten carbide balls having a total weight of 288 grams (see the Brinkman R1 catalog, part number 27-17-474-4). The automatic rotation direction reversal mode was chosen together with the highest speed of 540 revolutions per minute. The mixture was comminuted in this mode while under argon purge for 1 hour.

The comminuted mixture from the ball mill was then discharged into a carbon steel jar mill produced by Paul O. Abbe, Inc. of Little Falls, N.J.; the jar was "Assay" size (see page 13 of the Abbe A6 catalog) and had a capacity of 1.63 gallons. 130 grams of titanium dioxide (catalog number 11396, 1989-1990 Johnson Matthey/AESAR Group catalog), 20 grams of carbon (Huber Corporation's pelletized carbon balck, type N990), and 1 gram of oleic acid (catalog number)L 103, Spectrum Chemical Manufacturing Corp., Gardena, Calif.) were added to the mill. The mill was then enclosed in a glow box with argon atmosphere; and comminution of the mixture occurred under argon atmosphere for 36 hours at a speed of 190 revolutions per minute.

The comminuted material was discharged from the vessel, and pellets of 1 inch were pressed in a cylindrical die with a Carver Lab Press 13-872 (see page 897, Fischer '88 catalog, Fischer Scientific, Pittsburgh, Pa.); a pressure of 3 tons was used.

The pellets were then placed on a graphite boat, and the boat was placed in a graphite tubular furnace equipped with a graphite heating element and a Honeywell single channel automatic controller/programmer (model DCP 700). The pellets were then heated to a temperature of 860 degrees centigrade under argon purge, at which point ingition occurred.

The combusted material was then allowed to cool in the furnace. Thereafter, it was discharged to a plate roller/crusher, and it was crushed so that all of its particles were from about 0.5 to about 1.0 millimeters in diameter.

The crushed material was charged to a Roalox grinding jar (type 000, 0.1 gallon capacity, available as catalog number 774 from U.S. Stoneware of Mahwah, N.J.) and ground in a jar mill (model number 764AV, U.S. Stoneware) at 190 revolutions per minute until all of the particles were smaller than 53 microns.

The material from the mill was analyzed. X-ray diffraction analysis of the material revealed the major peaks of titanium carbide and alumina and small peaks of titanium and titanium nitride. Carbon analysis revealed that the material contained more than 35 weight percent of titanium carbide and that the titanium carbide component contained at least 19 percent of carbon.

The crude composite material was introduced into a graphite crucible and heated in argon in the furnace at a temperature of 1,400 degrees centigrade for 30 minutes. The heat-treated material was then cooled. X-ray-diffraction analysis of the cooled material revealed that the titanium peak and the titanium nitride peak had disappeared; the only peaks disclosed by the analysis were those for titanium carbide and alumina. Quantititative calculations revealed that the material contained more than 44 weight percent of titanium carbide.

EXAMPLE 2

Into the jar mill referred to in Example 1 were charged 1200 grams of carbon black obtainable from the Pelleter Company of the United States (code "SRF"), 400 grams of potassium hydrogen fluoride (Aldrich Corporation's reagent number 23,928-3), and 0.7 grams of oleic acid (catalog number OL 103, Spectrum Chemical Manufacturing Corp.). In substantial accordance with the procedure of Example 1, the mixture was ground for 36 hours.

Into a three-speed, four-liter blender (model number CB6SB, Waring Commerical catalog, Waring Products Division, Dynamics Corporation of America, New Hartford, Conn.) were charged 2 liters of petroleum ether (catalog number P1045, Spectrum Chemical Manufacturing Corp.) and 4 grams of of stearic acid (Aldrich reagent 17,536-6); this mixture was blended for 2.0 minutes at a speed of 15,500 r.p.m. To this slurry was added 130 grams of titanium dioxide (catalog number 11396, Johnson-Matthey-AEASAR Group catalog); and the mixture was blended for 3 minutes at a speed of 15,500 r.p.m. Then 60 grams of aluminum (catalog number 1401T, Alcoa Aluminum Company) and 28 grams of the carbon material from the jar mill were added to the blender; the mixture was then blended for another 5 minutes under ambient conditions at a speed of 15,500 r.p.m.

The blended material was then discharged to a metallic tray, placed into a Grieve bench oven (model EB-350, The Grieve Corporation, Round Lake, Ill.), and dried until it contained substantially no moisture. At least about 95 weight percent of this material was comprised of agglomerates which were at least 50 microns big.

The dried agglomerates were discharged into a graphite boat equipped with a hole in its bottom and placed in a graphite reactor tube reactor. Argon was introduced through the top of the reactor, blanketing it. The dried pellets in the graphite boat were ignited with a flame. Combustion occurred in about 5 seconds.

The combusted pellets were allowed to cool to ambient, and they were then examined under an Olympus Zoom Stereo microspcope (model SZ-Tr, Olympus Optical Co., Ltd., Tokyo, Japan); inspection revealed the presence of whisker-like single crystals. X-ray diffraction analysis showed that more than 35 weight percent of the material was titanium carbide and less than about 10 weight percent of the material was metallic titanium. A titanium nitride peak also was evident form the analysis.

The combusted pellets were gently crushed using a four deck vibratory sieve whose first screen is 2.5 mesh, whose second screen is 16 mesh, whose third screen is 28 mesh, and whose fourth screen is 60 mesh. A Tyler portable sieve shaker (see catalog number 04-909-4, page 980, Fisher 88 catalog) was used to shake the sieves.

The material from the collection pan sieve was then charged into a graphite crucible, the crucible was then placed into a furnace. The furnace was blanketed with argon. The crucible was heated to a temperature of 1,400 degrees centigrade for 30 minutes. Thereafter, it was allowed to cool.

X-ray analysis of the cooled material indicated that it contained no titaniunm, no titanium oxide, and no titanium nitride; only titanium carbide and alumina peaks were present. Image analysis indicated that more than 30 percent of the material in the composite was in whisker form.

EXAMPLE 3

In accordance with the procedure of Example 1, an activated aluminum component was prepared by comminuting aluminum and sodium fluoride. However, 14 grams of the aluminum, 0.2 grams of sodium fluoride, and 0.1 grams of oleic acid were used.

After the aluminum was activated for abut 1 hour, 30 grams of titanium dioxide (catalog number 11396, Johnson Matthey/ASEA), 5 grams of titanium carbide (catalog number 12,143, Johnson Matthey/AEAS), and 5 grams of carbon (Huber Corporation's pelletized carbon black, type N990) were charged. Then the mixture was comminuted under a vacuum of $10^{-2}$ Torr for 4 hours, with a break of 5 minutes between each hour.

The comminuted material was discharged from the vessel, and pellets of 1.0 inch were pressed in the die and press described in Example 1; a pressure of 12 tons was used.

The pellets were placed into a VWR Vacuum Oven (model 1410, VWR Scientific Inc., San Francisco, Calif.) and heated for 8 hours at a temperature of 300 degrees centigrade and a vacuum of $10^{-2}$ Torr. Thereafter, the dried pellets were allowed to cool in the reactor while the vacuum was maintained.

The dried pellets were then ignited in the furnace in substantial accordance with the procedure described in Example 1. The combusted pellets were then allowed to cool; and the cooled pellets were inspected. They showed no geometical variations and no cracks or missing material.

Thee cooled pellets were cut, their cross-sections were polished, and they were then subjected to X-ray diffraction and scanning electron microscope anlaysis. The X-ray diffraction flowchart revealed weak peaks of titanium, and no titanium nitride peaks; the a major peaks were titanium carbide and alumina. The scanning electron micrograph showed continuous material with some small pores inside huge agglomerates.

EXAMPLE 4

The procedure of Example 1 was repeated, with the exception that the preparation of the aluminum component, the ignition of the pellets, and the thermal conditioning of the combusted pellets took place under nitrogen atmosphere.

X-ray diffraction analysis revealed a flow chart showing major peaks of titanium nitride near titanium carbide. Quantitative analysis revealed more than 15 weight percent of a titanium carbide—titanium nitride solid solution in the composite.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

Thus, for example, the carbonaceous material described in connection with the preparation of the titanium carbide whisker material also may be used to prepare other materials having whisker morphology such as, e.g., composite materials comprised of whiskers of silicon carbide, tantalum carbide, boron carbide, and other carbide materials produced by combustion synthesis processes.

Thus, for example, the activated aluminum material described in connection with the preparation of the titanium carbide/alumina monolithic body may be used in connection with the preparation of nitrides and oxynitrides having whisker morphology such as whiskers of silicon nitride, titanium nitride, tantaluym nitride, aluminum nitride, silicon—aluminum—oxygen—nitrgogen compounds ("sialon"), titanium—aluminum—oxygen—nitrogen compounds)("tialon"), and the like. Furthermore, the activated aluminum material also may be used in the preparation of monolithic bodies comprised of alumina and non-xoide reinforcing materials, such as materials selected from the group consisting of carbides, nitrides, and silicides.

I claim:

1. A process for preparing a composite material comprised of about 44 to 54 weight percent of titanium carbide and about 45 to 53 weight percent of alumina, said process comprising the steps of;
   (a) providing an aluminum material selected from the group consisting of aluminum, aluminum alloys, and mixtures thereof, said aluminum material having a specific surface area of about 0.2 to 1.1 $m^2/g$ and ranging in size from about 4 to 28 microns, titania which is at least 98% pure with particle sizes smaller than about 53 microns, and amorphous carbon having a surface area of at least about 4 $m^2/g$;
   (b) comminuting a mixture of about 19 to 35 weight percent of said aluminum material, about 50 to 85 weight percent of said titania, and about 9 to 15 weight percent of said amorphous carbon under protective environment selected from the group consisting of inert gas and a vacuum of about $10^{-2}$ to $10^{-3}$ Torr until the mixture consists essentially of a single phase;

(c) pelletizing the comminuted, single-phase mixture, thereby forming a multiplicity of pellets; and (d) subjecting the pellets to a temperature in excess of 600° C., under protective environment until ignition to produce said composite.

2. The process as recited in claim 1 wherein said aluminum material is aluminum.

3. The process as recited in claim 2 wherein said aluminum material is an aluminum alloy consisting of aluminum and metal fluoride.

4. The process as recited in claim 3 wherein the mixture of aluminum material, titania, and amorphous carbon further comprises about 0.1 to 0.5 weight percent of oleic acid.

5. The process as recited in claim 1 wherein the mixture of aluminum material, titania, and amorphous carbon further comprises about 1.5 to 2.5 weight percent of a source of magnesia selected from the group consisting of magnesium oxide, magnesium carbonate, magnesium bicarbonate, magnesium chlorate, and elemental magnesium.

* * * * *